United States Patent [19]

Ball

[11] Patent Number: 4,463,772
[45] Date of Patent: Aug. 7, 1984

[54] FLUSH INLET FOR SUPERSONIC AIRCRAFT

[75] Inventor: William H. Ball, Mercer Island, Wash.

[73] Assignee: The Boeing Company, Seattle, Wash.

[21] Appl. No.: 306,745

[22] Filed: Sep. 29, 1981

[51] Int. Cl.$^3$ .............................................. B64D 33/02
[52] U.S. Cl. ................................... 137/15.2; 244/53 B
[58] Field of Search ............................. 137/15.1, 15.2; 244/53 B; 60/270 R

[56] References Cited

U.S. PATENT DOCUMENTS

| | | | |
|---|---|---|---|
| 2,721,715 | 10/1955 | Hoadley | 137/15.1 X |
| 3,041,827 | 7/1962 | Ferri | 244/53 B X |
| 3,265,331 | 8/1966 | Miles | 244/53 B |
| 3,624,751 | 11/1971 | Dettling | 137/15.1 X |
| 3,752,422 | 8/1973 | Runnels | 244/53 B X |

*Primary Examiner*—Alan Cohan
*Attorney, Agent, or Firm*—Hughes, Barnard & Cassidy

[57] ABSTRACT

A flush inlet and inlet air passage for supersonic aircraft including provisions for efficiently decelerating a supersonic airstream entering the inlet and converting such airstream to subsonic airflow within the inlet air passage prior to introduction into the aircraft's jet propulsion engine. More specifically, a two-dimensional inlet and convergent/divergent inlet air passage for supersonic jet aircraft wherein the inlet is flush with the aircraft's external surface, and the supersonic airflow entering the inlet is reduced to transonic or subsonic velocity by means of a series of weak shock waves as the airstream transits the convergent portion of the inlet passage and, thereafter, the subsonic or transonic flow is further decelerated as it transits the divergent portion of the inlet passage prior to introduction into the engine; such inlet including: (i) an expansion corner at the upstream leading edge of the inlet for turning and expanding the freestream airflow; (ii) provision for inflight optimization of the inlet cant angle at the expansion corner as a function of the actual Mach number; (iii) provision for inflight adjustment of the inlet passage boundary walls as a function of the speed and pressure of the inlet airflow; and (iv), means for removing excess low energy boundary layer air from the inlet passage surfaces to insure formation of a proper shock wave pattern to effect airflow deceleration. An exemplary supersonic flush inlet designed for operation at speeds of Mach 2.2, and below, has been illustrated; and, provision is made for increasing the pressure of the low energy boundary layer air extracted from the inlet passage to levels which readily permit of overboard discharge.

22 Claims, 5 Drawing Figures

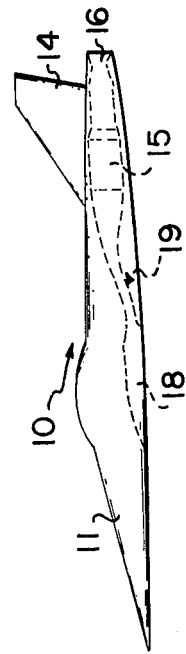
FIG. 1
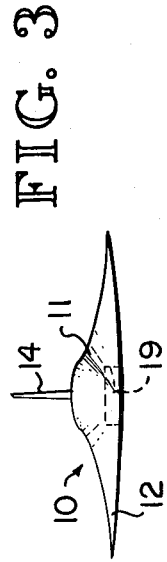
FIG. 2
FIG. 3
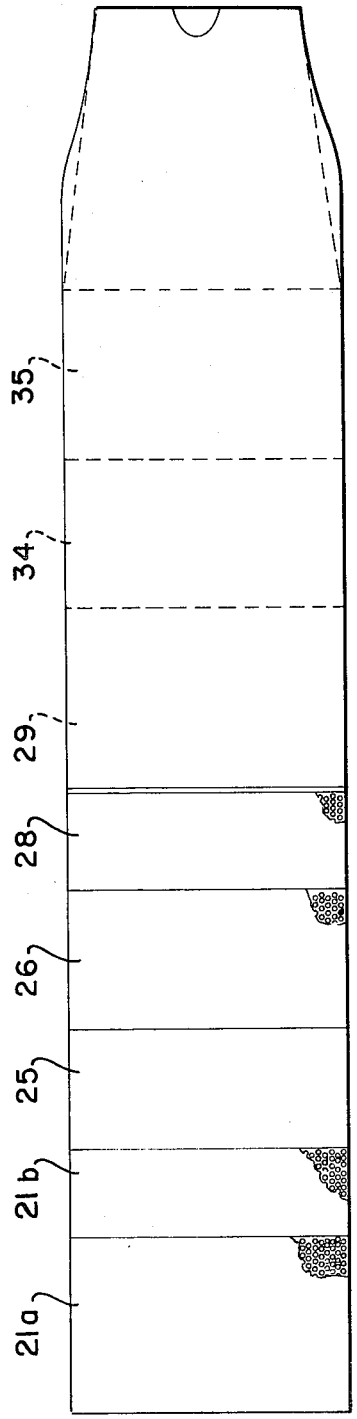
FIG. 4

FLUSH INLET FOR SUPERSONIC AIRCRAFT

BACKGROUND OF THE INVENTION

1. Field of the Invention

The present invention relates generally to a flush inlet for supersonic aircraft; and, more particularly, to an adjustable two-dimensional, convergent/divergent inlet and inlet passage employing an expansion corner at the upstream leading edge of the inlet entrance so as to permit the inlet to be mounted flush with the external surface of the aircraft; and, wherein the inlet passage is configured in such a way as to cause the generation of a series of weak shock waves as the airstream transits the convergent portion of the inlet passage so as to decelerate the supersonic airflow to transonic or subsonic levels, with the thus decelerated airstream being further decelerated to subsonic levels on the order of Mach 0.4 as it passes through the divergent portion of the inlet passage prior to introduction into the jet propulsion engine. To insure formation of proper shock wave patterns as the supersonic airstream is decelerated, provision is made for removing excess low energy boundary layer air from the inlet passage surfaces, with such extracted low energy boundary layer air that is at pressure levels below freestream static pressure being increased in pressure so as to permit discharge overboard.

In the design of present day supersonic jet aircraft, provision must be made for supplying large quantities of subsonic airflow to supply the requirements of the jet propulsion engine. However, since such aircraft are designed to fly at supersonic speeds, provision must also be made for decelerating the airflow supplied to the engine to the subsonic speeds required by such engines. In general, prior to the advent of the present invention this has been accomplished by employing air inlets which are designed to protrude into the airstream external of the aircraft. Such protruding, and often frontal, air inlets greatly increase the cross-sectional area of the aircraft and deleteriously affect aerodynamic and overall system performance. The present invention is intended to provide a flush inlet for supersonic aircraft which avoids the need to employ either protruding or frontal inlet configurations.

2. Description of the Prior Art

As stated above, most known prior art approaches employed with air inlet designs for supersonic aircraft have employed inlet designs which protrude into the airstream. Typical of such approaches is that disclosed in U.S. Pat. No. 2,971,331-Silverman et al. wherein the patentees disclose an aircraft employing a pair of protruding inlets on opposite sides of the fuselage. Other typical disclosures of protruding inlets are found in U.S. Pat. Nos. 3,104,522-Pennington et al., U.S. Pat. No. 3,417,767-Young, and U.S. Pat. No. 3,643,676-Limage et al. U.S. Pat. No. 2,339,575-Lee, while not relating to supersonic aircraft, is of general interest for its disclosure of a frontal air inlet in combination with diverse complex mechanisms for inducting air from transverse flow streams.

It has further been recognized in the prior art that provision may be made for removing boundary layer air from the inlet air passage. Thus, various systems capable of extracting boundary layer air have been disclosed in the aforesaid Silverman et al. U.S. Pat. No. 2,971,331 and may be found in U.S. Pat. Nos. 2,589,945-Leduc and U.S. Pat. No. 4,000,869-Wong et al.

In general, however, the foregoing typical prior art approaches employ air inlets which protrude into the airstream and which are defined by fixed inlet surfaces. Such prior art approaches do not employ expansion corners at the upstream edge of the inlet and do not provide means for adjusting the inlet cant angle at an expansion corner as a function of the speed of the aircraft. As previously stated, the protruding air inlets of such typical prior art constructions serve to increase the cross-sectional area of the aircraft and, additionally, they seriously degrade the aerodynamic and overall system performance of the aircraft.

It should be noted that flush inlets per se have been recognized in the prior art. See, for example, U.S. Pat. Nos. 2,694,357-Lee and U.S. Pat. No. 2,721,715-Hoadley. The disclosures in the aforesaid Lee and Hoadley patents do not relate to supersonic inlet designs and employ fixed inlet defining surfaces. Such devices simply do not permit of efficient supersonic operation.

One further prior art disclosures of general interest is that found in U.S. Pat. No. 3,624,751-Dettling, a disclosure wherein the patentee contemplates employment of a fluid jet directed into the airstream surrounding the aircraft skin surface for producing a shock wave capable of diverting the airstream into a flush inlet. Again, the inlet is defined by fixed surfaces. No provision is made for optimizing the inlet configuration as a function of the speed of the aircraft, nor are provisions made for decelerating supersonic air inflow prior to introduction into a jet engine.

SUMMARY OF THE INVENTION

Accordingly, it is a general aim of the present invention to provide a flush supersonic inlet and inlet passage including provisions for efficiently decelerating supersonic airflow entering the inlet and reducing such supersonic flow to subsonic flow prior to introduction into the jet propulsion engine.

A further important objective of the invention is the provision of a flush mounted inlet suitable for use with supersonic jet aircraft and employing an adjustable expansion corner at the upstream edge of the inlet for turning and expanding the freestream supersonic airflow and for directing such expanded turned airstream through a convergent/divergent inlet air passage configured to produce a series of weak shock waves for effecting deceleration of the airstream prior to introduction into the jet engine.

In another of its important aspects, it is an object of the invention to provide a flush mounted supersonic air inlet employing an adjustable expansion corner at the upstream edge of the inlet that can be adjusted to vary the cant angle of the inlet with changes in the supersonic speed at which the aircraft is flying so as to optimize the expansion and turning characteristics of the inlet in accordance with actual inflight speed conditions. An ancillary objective of the invention includes provisions for bleeding low energy boundary layer air from the inlet surfaces defining the expansion corner so as to optimize the shock wave generating characteristics of the supersonic inlet at varying speeds of the inlet airstream.

In one of its more detailed aspects, it is an objective of the present invention to provide a supersonic air inlet and convergent/divergent inlet air passage including provisions for reconfiguring the contour of the convergent/divergent passage during inflight operation so as to optimize the inlet air passage configuration as a function of the velocity of air movement through the passage.

A further and more detailed objective of the invention is the provision of means for bleeding low energy boundary layer air from the inlet passage walls so as to prevent the buildup of low energy boundary layer regions; and, wherein the extracted low energy boundary layer air which exists at static pressures below ambient levels is compressed to pressures greater than freestream static pressure so as to permit discharge of such extracted boundary layer air overboard.

DESCRIPTION OF THE DRAWINGS

These and other objects and advantages of the present invention will become more readily apparent upon reading the following detailed description and upon reference to the attached drawings, in which:

FIG. 1 is a highly simplified diagrammatic bottom view of a typical delta wing supersonic aircraft incorporating a flush mounted supersonic air inlet embodying features of the present invention;

FIG. 2 is a simplified side elevation or silhouette view of the delta wing aircraft depicted in FIG. 1, illustrating particularly the orientation of the flush inlet, inlet passage, jet engine and exhaust nozzle;

FIG. 3 is a simplified front elevational view of the aircraft depicted in FIGS. 1 and 2, here illustrating diagrammatically the two-dimensional nature of the air inlet and inlet passage;

FIG. 4 is a plan view, partly in section, of the upper transvere inlet passage boundary layer walls; and, FIG. 5 is a diagrammatic side elevational view, partly in section, depicting details of the air inlet and air passage configurations; and, illustrating particularly the boundary layer air bleed system and the means provided for reconfiguring the contour of both the expansion corner at the upstream edge of the air inlet and the convergent/divergent inlet air passage so as to optimize the configuration required to generate relatively weak shock waves which serve to decelerate the supersonic airflow through the passage to subsonic speeds suitable for introduction into the jet propulsion engine.

Figure 5:
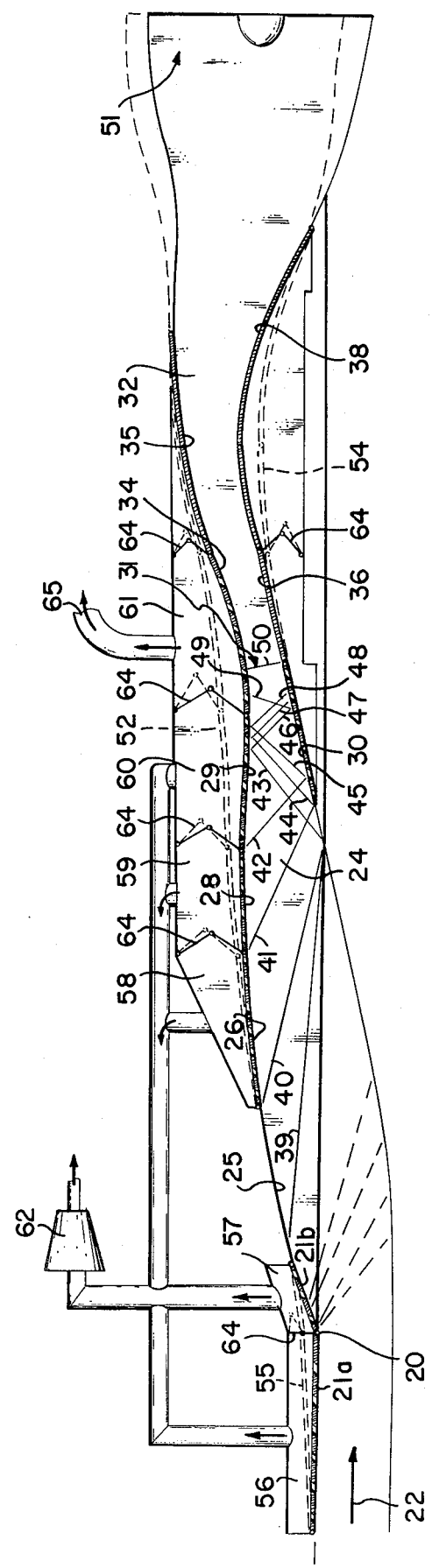

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

Referring first to FIGS. 1, 2 and 3 conjointly, there has been illustrated in highly generalized fashion a typical configuration for a supersonic aircraft, generally indicated at 10, and of the type suitable for employing the flush mounted supersonic air inlet of the present invention. As here shown, the exemplary supersonic aircraft 10 includes a main aerodynamically streamlined fuselage 11, a primary delta-type airfoil 12, and a vertical stabilizer 14. The aircraft 10 is of the type employing a conventional jet engine 15 mounted centrally within the empennage area of the aircraft's main body or fuselage 11 and having an exhaust nozzle 16. An air inlet 18 is mounted flush with the under surface of the main aircraft body 11 and communicates with a convergent/divergent inlet air passage, generally indicated at 19 in FIG. 2, for supplying the air required by jet engine 15. As best illustrated in FIG. 3, it will be noted that the inlet air passage 19 is of the two-dimensional type.

As the ensuing description proceeds, those skilled in the art will appreciate that the optimal configurations of a flush supersonic air inlet and inlet air passage are directly related to, and functions of, the altitude at which the aircraft is operating and the Mach number representative of the speed at which the aircraft is traveling. Therefore, it will be understood that while such configurations and dimensions are critical to operation of the aircraft at any given speed, they will vary widely and they are not critical to the exemplary embodiment of the invention herein described. Thus, the present invention is hereinbelow described in connection with a flush mounted supersonic air inlet which has been designed for optimal results when the supersonic aircraft is moving at speeds of Mach 2.2 and below; but, such supersonic speeds are not considered limiting to the invention in its broader aspects.

In accordance with the present invention, the flush supersonic inlet 18 and convergent/divergent inlet air passage 19 are provided with means for turning and expanding the external supersonic airstream and directing such stream into and through the convergent/divergent passage where the airstream is subjected to a series of relatively weak shock waves that serve to decelerate the supersonic airflow to at least transonic velocity, with the resultant decelerated airstream being further decelerated as it transits the divergent portion of the convergent/divergent air passage 19 so that such air stream is moving at suitable subsonic speeds which are appropriate for introduction into the jet propulsion engine 15.

In carrying out this aspect of the invention, and as best illustrated by reference to FIG. 5, the air inlet 18 is provided with an adjustable expansion corner 20 at its upstream leading edge which is here defined by a pair of hingedly interconnected panels or ramps 21a and 21b. Since the expansion corner 20 in the exemplary form of the invention is intended for use in a flush supersonic inlet designed for operation at speeds of Mach 2.2, it has been found that the employment of a 19° inlet cant angle permits the inlet 18 to be formed in a plane flush with the skin surface on the underside of the aircraft 10. Thus, the arrangement is such that freestream air moving in the direction of the arrow 22 (FIG. 5) is turned and expanded as it reaches the expansion corner 20 utilizing a 19° Prandtl-Meyer expansion with the thus turned and expanded airstream moving into and through the convergent portion 24 of the convergent/divergent air passage 19. Because the external airstream is expanded as it passes the expansion corner 20, it is accelerated to a higher Mach number as it turns in a direction parallel to the ramp 21b defining the internal upstream wall of the inlet passage 19. *Merely by way of example*, assuming that the freestream airflow at the point indicated by the arrow 22 is moving at a speed of Mach 2.2 relative to the aircraft 10, then as such airstream is turned and expanded at the expansion corner 20, it is accelerated to a supersonic speed on the order of Mach 3.05—that is to say, the static pressure level of the airstream forward of the expansion corner 20 corresponds to Mach 2.2, while the flow immediately aft of the expansion corner 20 is at a static pressure level corresponding to Mach 3.05.

In keeping with the present invention, the convergent portion 24 of the convergent/divergent air passage 19 is defined by transverse upper panels or ramps 25, 26, 28 and 29 and a lower transverse panel or ramp 30. Aft of the throat, generally indicated at 31, of the convergent/divergent passage 19, the air passage includes a divergent portion 32 defined by transverse upper panels 34 and 35, and lower transverse panels 36, 38. Thus, the arrangement is such that as the turned and expanded supersonic airstream enters the convergent portion 24 of the inlet air passage 19, it is decelerated by a series of shock waves 39 through 59, reaching transonic velocity of Mach 1.0 in or about the throat region 31 of the convergent/divergent air passage 19. As the airstream continues to move aft through the divergent portion 32 of the passage 19, it is further decelerated; and, at the inlet, generally indicated at 51 in FIG. 5, to the jet engine 15 (FIG. 1) such airstream is reduced to a velocity of approximately Mach 0.4—viz., a speed suitable for introduction into the jet engine 15.

In order to efficiently accomplish deceleration of the supersonic airstream, and to provide the proper geometry to produce a series of weak shock waves 39-50, the shape of the inlet passage 19 is preferably adjustable to permit reconfiguration of the contour of the convergent/divergent air passage 19 with changes in flight speed. To accomplish this, the upper transverse panel or ramp 26 is pivotally interconnected to ramp 25, while the ramps 26, 28, 29, 34 and 35, and the lower transverse panels or ramps 36, 38, are pivotally interconnected one to another and are moveable between the solid line positions depicted in FIG. 5 and the broken line positions indicated at 52 and 54. The particular means employed for shifting the ramps or panels between their solid line positions shown in FIG. 5 and their retracted broken line positions in order to optimize the geometry of the convergent/divergent passage 39 are completely conventional and well known to those skilled in the art; and, therefore, are not further described in detail herein.

In keeping with the present invention, provision is also made for adjusting the angle defined by the expansion corner 20 so as to optimize the air inlet's cant angle at supersonic speeds less than Mach 2.2, as well as at transonic and subsonic speeds. To accomplish this, the panel 21a immediately forward of the expansion corner 20 and the panel 21b at the upstream end of the inlet air passage 19 are hingedly connected to one another at the expansion corner 20 as well as to their respective upstream and downstream panels, and may be shifted from the solid line position shown in FIG. 5 suitable for operation as speeds of Mach 2.2 to lesser angles as indicated by the dotted line retracted position 55. As a consequence of this arrangement, takeoff doors are not required for the inlet 18 since the large lip area defined by the basic inlet ramps 21a, 21b is sufficient to maintain the lip entrance Mach number well below 0.5; i.e., a value below which excessive sharp lip losses should not be encountered.

In accordance with another of the important aspects of the present invention, provision is made for bleeding the low energy boundary layer air at various points along the length of the convergent/divergent air passage so as to prevent the build-up of low energy boundary layer regions, and so as to optimize the formation of proper shock wave patterns to achieve deceleration of the supersonic airstream. To accomplish this, the panels or ramps 21a, 21b, 25, 28, 29 and 30 are preferably formed of porous or air permeable material. Thus, and as previously indicated, since the exemplary supersonic air inlet 18 is designed for operation at speeds of Mach 2.2, the freestream airflow forward of the expansion corner 20 is at a static pressure level corresponding to Mach 2.2, while the flow aft of the expansion corner 20 is at a static pressure level corresponding to Mach 3.05. Consequently, in order that the low energy boundary layer bleed air can be discharged overboard, it is necessary to increase the pressure thereof to levels above freestream static pressure; and, preferably, to levels on the order of twice freestream static pressure. To accomplish this, plenum chambers 56 through 61 are provided interiorly of the aircraft and surrounding the expansion corner 20 and the porous walls or ramps defining the convergent/divergent inlet air passage 19. The arrangement is such that low energy boundary layer air at the surface of the porous ramps 21a, 21b defining the expansion corner 20 is collected in plenum chambers 56 and 57, respectively, and ducted to a compressor 62. Similarly, low energy boundary layer air adjacent the porous ramps 26, 28, 29 and 30 (and, preferably, corresponding porous sidewalls, not shown) is collected in plenum chambers 58 through 60 and ducted to compressor 62. The compressor 62 serves to increase the pressure of the extracted low energy level boundary layer bleed air to a pressure—preferably on the order of twice the freestream static pressure—suitable to permit discharge of the extracted boundary layer air overboard. Seal-type hinged divider curtains 64 are provided for subdividing the plenum chambers 56 through 61 into regions of differing pressures, with such divider curtains being capable of flexing as the expansion corner ramps 21a, 21b and moveable ramps 26, 28, 29, 34, 35, 36 and 38 are flexed between their limit positions. Excess boundary layer air collected in plenum chamber 61 does not require an air compressor for establishing positive suction since the air entering this aft plenum chamber is at a high enough pressure to permit direct discharge overboard as indicated at 65.

Thus, those skilled in the art will appreciate that there has herein been described an improved flush mounted supersonic inlet and a two-dimensional convergent/divergent inlet air passage characterized by their ability to turn and expand an external supersonic airstream about an expansion corner located at the leading upstream edge of the inlet, with the thus turned and expanded airstream being directed into the inlet air passage and accelerated to even higher supersonic velocities; yet, wherein the configuration of the inlet air passage serves to generate a series of weak shock waves that tend to decelerate the supersonic airstream to a transonic level at the throat of the convergent/divergent passage, with the transonic airstream being further decelerated to suitable subsonic levels as it moves rearwardly through the divergent portion of the inlet air passage. The provision of moveable ramps defining the transverse upper and lower walls of the convergent/divergent passage permits of dynamic reconfiguration of the passage to meet varying speed conditions; while the adjustable expansion corner permits of modification of the air inlet geometry so as to optimize the geometry for supersonic, transonic and subsonic speeds lower than the maximum supersonic speed for which the inlet is designed. Finally, the provision of means for bleeding low energy boundary layer air serves to optimize the shock generating characteristics of the air inlet and passage.

What is claimed is:

1. A flush supersonic air inlet and convergent/divergent inlet air passage for supersonic aircraft of the type having a jet propulsion engine, comprising, in combination:
   (a) a flush mounted air inlet formed in the surface of the aircraft body;
   (b) a convergent/divergent inlet air passage having a throat at the juncture of the convergent and divergent portions of said passage and extending from said flush mounted air inlet to the jet propulsion engine inlet;
   (c) an expansion corner defining an adjustable cant angle formed at the upstream leading edge of said flush mounted air inlet for turning the external airstream into said inlet and passage and expanding and accelerating the thus redirected airstream;
   (d) means for adjusting said expansion corner cant angle during inflight operation as a function of the actual Mach number at which the supersonic aircraft is operating for inflight optimization of said supersonic air inlet;
   (e) said convergent portion of said convergent/divergent air passage being shaped so as to generate a series of weak shock waves as the expanded and thus accelerated airstream moves towards said throat for progressively decelerating said airstream from supersonic velocities to at least transonic velocity at said throat; and,
   (f) said divergent portion of said convergent/divergent air passage serving to further decelerate said airstream from transonic velocity to subsonic velocity as said airstream moves from said throat to the jet propulsion engine inlet.

2. A flush supersonic air inlet and convergent/divergent inlet air passage for supersonic aircraft of the type having a jet propulsion engine, comprising, in combination:
   (a) a flush mounted air inlet formed in the surface of the aircraft body;
   (b) a convergent/divergent inlet air passage having a throat at the juncture of the convergent and divergent portions of said passage and extending from said flush mounted air inlet to the jet propulsion engine inlet;
   (c) an expansion corner formed at the upstream leading edge of said flush mounted air inlet for turning the external airstream into said inlet and passage and expanding and accelerating the thus redirected airstream, said expansion corner being defined by a pair of transverse panels hingedly interconnected to one another and to the respective adjacent upstream and downstream aircraft structure;
   (d) means for flexing said pair of expansion corner defining panels so as to selectively vary the angle of said expansion corner as a function of the altitude and speed of the aircraft and to thereby vary the turning angle of the airstream and the expansion characteristics of the inlet;
   (e) said convergent portion of said convergent/divergent air passage being shaped so as to generate a series of weak shock waves as the expanded and thus accelerated airstream moves towards said throat for progressively decelerating said airstream from supersonic velocities to at least transonic velocity at said throat; and,
   (f) said divergent portion of said convergent/divergent air passage serving to further decelerate said airstream from transonic velocity to subsonic velocity as said airstream moves from said throat to the jet propulsion engine inlet.

3. A flush supersonic air inlet and convergent/divergent inlet air passage as set forth in claim 2 wherein said pair of expansion corner defining panels are air permeable, and means are provided for removing low energy boundary layer air adjacent the exposed surfaces of said panels.

4. A flush supersonic air inlet and convergent/divergent inlet air passage as set forth in claim 2 wherein means are provided for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

5. A flush supersonic air inlet and convergent/divergent inlet air passage as set forth in claim 2 wherein at least portions of said convergent portion of said convergent/divergent air passage are air permeable, and means are provided for removing low energy boundary layer air adjacent the exposed surface of said convergent portion of said passage.

6. A flush supersonic air inlet and convergent/divergent inlet air passage as set forth in claim 2 wherein at least portions of said convergent portion of said convergent/divergent air passage are air permeable, means are provided for removing low energy boundary layer air adjacent the exposed surface of said convergent portion of said passage, and further including means for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

7. A flush supersonic air inlet and convergent/divergent inlet air passage as set forth in claim 2 wherein at least certain of the surfaces defining said expansion corner and said convergent portion of said passage are air permeable, means are provided for removing low energy boundary layer air adjacent said air permeable surfaces, and means are provided for increasing the pressure of said removed low energy boundary layer air to levels greater than freestream static pressure.

8. A two-dimensional flush supersonic air inlet and convergent/divergent inlet air passage for supersonic aircraft of the type having a jet propulsion engine, comprising, in combination:
   (a) a two-dimensional flush mounted air inlet formed in the surface of the aircraft body;
   (b) a two-dimensional convergent/divergent inlet air passage having generally parallel sidewalls, a series of upper interconnected transverse panels defining the upper wall of said passage, a series of lower interconnected transverse panels defining the lower wall of said passage, and a throat at the juncture of the convergent and divergent portions of said passage, with said passage extending from said two-dimensional flush mounted air inlet to the jet propulsion engine inlet;
   (c) an expansion corner defining an adjustable cant angle formed at the upstream leading edge of said two-dimensional flush mounted air inlet for turning the external airstream into said inlet and passage and expanding and accelerating the thus redirected airstream;

(d) means for adjusting said expansion corner cant angle during inflight operation as a function of the actual Mach number at which the supersonic aircraft is operating for inflight optimization of said supersonic air inlet;

(e) said interconnected transverse upper ramps in said convergent portion of said convergent/divergent passage being angularly related to one another and positioned so as to generate a series of weak shock waves as the expanded and thus accelerated airstream moves towards said throat for progressively decelerating said airstream from supersonic velocities to at least transonic velocity at said throat; and, (f) said divergent portion of said convergent/divergent air passage serving to further decelerate said airstream from transonic velocity to subsonic velocity as said airstream moves from said throat to the jet propulsion engine inlet.

9. A two-dimensional flush supersonic air inlet and convergent/divergent inlet air passage for supersonic aircraft of the type having a jet propulsion engine, comprising, in combination:

(a) a two-dimensional flush mounted air inlet formed in the surface of the aircraft body;

(b) a two-dimensional convergent/divergent inlet air passage having generally parallel sidewalls, a series of upper interconnected transverse panels defining the upper wall of said passage, a series of lower interconnected transverse panels defining the lower wall of said passage, and a throat at the juncture of the convergent and divergent portions of said passage, with said passage extending from said two-dimensional flush mounted air inlet to the jet propulsion engine inlet;

(c) an expansion corner formed at the upstream leading edge of said two-dimensional flush mounted air inlet for turning the external airstream into said inlet and passage and expanding and accelerating the thus redirected airstream, said expansion corner being defined by a pair of transverse panels hingedly interconnected to one another and to the respective adjacent upstream and downstream aircraft structure;

(d) means for flexing said pair of expansion corner defining panels so as to selectively vary the angle of said expansion corner as a function of the altitude and speed of the aircraft and to thereby vary the turning angle of the airstream and the expansion characteristics of the inlet;

(e) said interconnected transverse upper ramps in said convergent portion of said convergent/divergent passage being angularly related to one another and positioned so as to generate a series of weak shock waves as the expanded and thus accelerated airstream moves towards said throat for progressively decelerating said airstream from supersonic velocities to at least transonic velocity at said throat; and, (f) said divergent portion of said convergent/divergent air passage serving to further decelerate said airstream from transonic velocity to subsonic velocity as said airstream moves from said throat to the jet propulsion engine inlet.

10. A two-dimensional flush supersonic air inlet and convergent/divergent inlet air passage as set forth in claim 9 wherein said pair of expansion corner defining panels are air permeable, and means are provided for removing low energy boundary layer air adjacent the exposed surfaces of said expansion corner defining panels.

11. A two-dimensional flush supersonic air inlet and convergent/divergent inlet air passage as set forth in claim 9 wherein means are provided for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

12. A two-dimensional flush supersonic air inlet and convergent/divergent inlet air passage as set forth in claim 9 wherein at least portions of said convergent portion of said convergent/divergent air passage are air permeable, and means are provided for removing low energy boundary layer air adjacent the exposed surface of said convergent portion of said passage.

13. A two-dimensional flush supersonic air inlet and convergent/divergent inlet air passage as set forth in claim 9 wherein at least portions of said convergent portion of said convergent/divergent air passage are air permeable, means are provided for removing low energy boundary layer air adjacent the exposed surface of said convergent portion of said passage, and further including means for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

14. A two-dimensional flush supersonic air inlet and convergent/divergent inlet air passage as set forth in claim 9 wherein at least certain of the surfaces defining said expansion corner and said convergent portion of said passage are air permeable, means are provided for removing low energy boundary layer air adjacent said air permeable surfaces, and means are provided for increasing the pressure of said removed low energy boundary layer air to levels greater than freestream static pressure.

15. A flush supersonic air inlet and convergent/divergent inlet air passage as set forth in claim 1 wherein means are provided for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

16. A flush supersonic air inlet and convergent/divergent inlet air passage as set forth in claim 1 wherein at least portions of said convergent portion of said convergent/divergent air passage are air permeable, and means are provided for removing low energy boundary layer air adjacent the exposed surface of said convergent portion of said passage.

17. A flush supersonic air inlet and convergent/divergent inlet air passage as set forth in claim 1 wherein at least portions of said convergent portion of said convergent/divergent air passage are air permeable, means are provided for removing low energy boundary layer air adjacent the exposed surface of said convergent portion of said passage, and further including means for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

18. A flush supersonic air inlet and convergent/divergent inlet air passage as set forth in claim 1 wherein at least certain of the surfaces defining said expansion corner and said convergent portion of said passage are air permeable, means are provided for removing low energy boundary layer air adjacent said air permeable surfaes, and means are provided for increasing the pressure of said removed low energy boundary layer air to levels greater than freestream static pressure.

19. A two-dimensional flush supersonic air inlet and convergent/divergent inlet air passage as set forth in claim 8 wherein means are provided for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

20. A two-dimensional flush supersonic air inlet and convergent/divergent inlet air passage as set forth in claim 8 wherein at least portions of said convergent portion of said convergent/divergent air passage are air permeable, and means are provided for removing low energy boundary layer air adjacent the exposed surface of said convergent portion of said passage.

21. A two-dimensional flush supersonic air inlet and convergent/divergent inlet air passage as set forth in claim 8 wherein at least portions of said convergent portion of said convergent/divergent air passage are air permeable, means are provided for removing low energy boundary layer air adjacent the exposed surface of said convergent portion of said passage, and further including means for varying the geometry of said convergent/divergent inlet air passage as a function of the altitude and speed of the aircraft so as to optimize the geometry of said passage for producing a series of relatively weak shock waves suitable for decelerating the airstream from supersonic velocity at said air inlet to subsonic velocity at the jet propulsion engine inlet.

22. A two-dimensional flush supersonic air inlet and convergent/divergent inlet air passage as set forth in claim 8 wherein at least certain of the surfaces defining said expansion corner and said convergent portion of said passage are air permeable, means are provided for removing low energy boundary layer air adjacent said air permeable surfaces, and means are provided for increasing the pressure of said removed low energy boundary layer air to levels greater than freestream static pressure.

* * * * *